United States Patent [19]

Craft

[11] Patent Number: 4,967,504
[45] Date of Patent: Nov. 6, 1990

[54] FISHING ROD AND REEL PROTECTOR

[76] Inventor: Homer L. Craft, 6143 Ivanhoe Rd., Bartlett, Tenn. 33134

[21] Appl. No.: 420,168

[22] Filed: Oct. 12, 1989

Related U.S. Application Data

[63] Continuation-in-part of Ser. No. 250,125, Sep. 27, 1988.

[51] Int. Cl.⁵ ............................................. A01K 97/08
[52] U.S. Cl. ................................................... 43/26
[58] Field of Search ........................................ 43/26

[56] References Cited

U.S. PATENT DOCUMENTS

| | | | |
|---|---|---|---|
| 2,149,087 | 2/1939 | Fisher | 43/26 |
| 2,902,790 | 9/1959 | Harvey | 43/26 |
| 3,131,503 | 5/1964 | Gottula | 43/26 |
| 3,618,253 | 11/1971 | Edwards | 43/26 |
| 3,624,948 | 12/1971 | De Baker | 43/26 |
| 3,641,697 | 2/1972 | Heidtman | 43/26 |
| 4,171,588 | 10/1979 | Hoffman | 43/26 |
| 4,222,193 | 9/1980 | Beck | 43/26 |
| 4,641,454 | 2/1987 | Ray | 43/26 |

FOREIGN PATENT DOCUMENTS

| | | | |
|---|---|---|---|
| 70945 | 1/1976 | Australia | 43/26 |
| 1419803 | 10/1965 | France | 43/26 |

Primary Examiner—Kurt Rowan
Attorney, Agent, or Firm—Walker & McKenzie

[57] ABSTRACT

A holder for protecting a fishing rod and fishing reel. The holder includes an elongated tube having a hollow interior for receiving a rod portion of the fishing rod, the tube having a first end and a second end; and a body having a hollow interior for receiving the fishing reel and at least a portion of a handle portion of the fishing rod; the body having a first end and a second end; the first end of the body being attached to the first end of the tube with the hollow interior of the body communicating with the hollow interior of the tube.

4 Claims, 1 Drawing Sheet

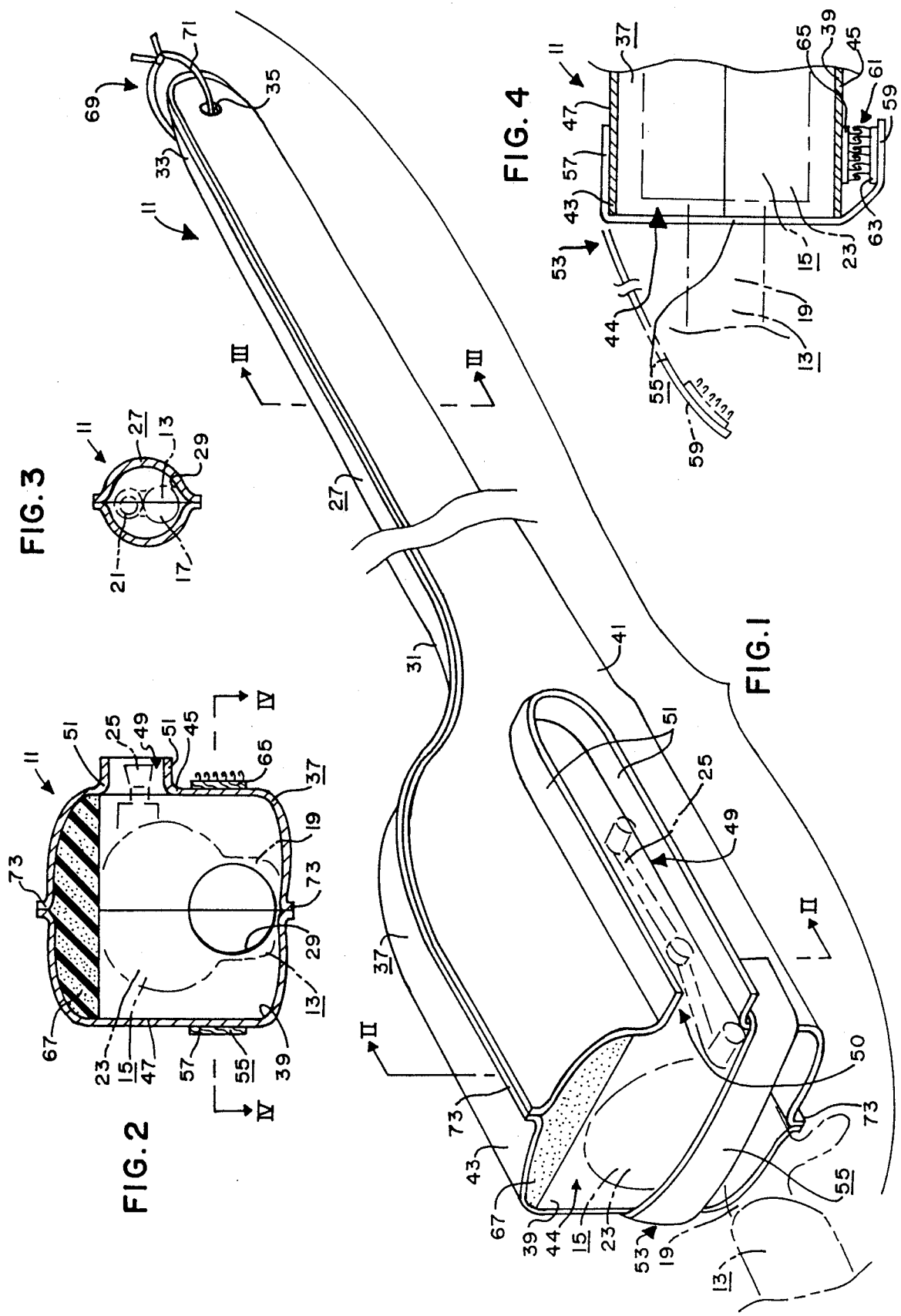

FISHING ROD AND REEL PROTECTOR

CROSS-REFERENCE TO RELATED APPLICATION

This is a continuation-in-part of pending design application Ser. No. 07/250,125, filed Sept. 27, 1988, entitled "FISHING ROD AND REEL HOLDER."

BACKGROUND OF THE INVENTION

1. Field of the Invention

The present invention relates, in general, to a device for holding and protecting a fishing rod and reel.

2. Information Disclosure Statement

The typical manner of transporting a fishing rod and reel from one location to another is to merely place the rod and reel in a car trunk, truck bed, etc. This often results in broken and/or damaged rods and reels. Hard tubes constructed of metal, plastic and the like have been developed to hold and protect fishing rods but require that the fishing reel be removed from the rod prior to inserting the rod into the tube. None of the known prior art devices disclose or suggest the present invention. More specifically, the known prior art does not disclose or suggest a fishing rod and fishing reel holder including an elongated tube having a hollow interior or receiving the rod portion of the fishing rod, the tube having a first end and a second end; and a body having a hollow interior for receiving the fishing reel and at least a portion of the handle portion of the fishing rod; the body having a first end and a second end; the first end of the body being attached to the first end of the tube with the hollow interior of the body communicating with the hollow interior of the tube.

SUMMARY OF THE INVENTION

The present invention is directed toward providing an improved holder or case for a fishing reel and fishing rod. The concept of the present invention is to provide a strong, rigid holder that a fishing rod with a fishing reel attached thereto can be easily inserted into for protection during transport and storage, to prevent the fishing rod and fishing reel from becoming tangled with other fishing rods and fishing reels, etc.

The holder of the present invention includes an elongated tube having a hollow interior for receiving a rod portion of a fishing rod, the tube having a first end and a second end; and a body having a hollow interior for receiving a fishing reel and at least a portion of a handle portion of the fishing rod; the body having a first end and a second end; the first end of the body being attached to the first end of the tube with the hollow interior of the body communicating with the hollow interior of the tube.

BRIEF DESCRIPTION OF THE DRAWINGS

FIG. 1 is a perspective view of the fishing rod and fishing reel holder of the present invention with a portion of a fishing rod and fishing reel shown in broken lines and with a portion of the holder broken away for clarity.

FIG. 2 is a sectional view substantially as taken on line II—II of FIG. 1.

FIG. 3 is a sectional view substantially as taken on line III—III of FIG. 1.

FIG. 4 is a sectional view substantially as taken on line IV—IV of FIG. 2 with the securing means shown in an open position in broken lines.

DESCRIPTION OF THE PREFERRED EMBODIMENT

The preferred embodiment of the holder 11 of the present invention is used to contain and protect a fishing rod 13 and a fishing reel 15. The fishing rod 13 may be any type well known to those skilled in the art such as a casting rod, a spinning rod, a spin-cast rod, a fly rod, etc., and includes an elongated rod portion 17 and a handle portion 19 secured to the butt end of the rod portion 17 for allowing the user of the fishing rod 13 to properly hold the fishing rod 13 and for providing means to allow the fishing reel 15 to be securely attached to the fishing rod 13, etc., as will now be apparent to those skilled in the art. A plurality of eyelet-type guides 21 are typically attached to the rod portion 17 for guiding fishing line from the fishing reel 15 along the rod portion 17 as will now be apparent to those skilled in the art. The fishing reel 13 may also be any type well known to those skilled in the art such as a casting reel, a spinning reel, a spin-cast reel, a fly reel, etc., and includes a body portion 23 for being fixedly attached to the handle portion 19 of the fishing rod 13 and a crank portion 25 for allowing the user of the fishing reel 15 to wind fishing line onto the fishing reel 15 as will now be apparent to those skilled in the art.

The holder 11 includes an elongated tube 27 having a hollow interior 29 for receiving at least the distal end of the rod portion 17 of the fishing rod 13. The hollow interior 29 is large enough to allow the distal end of the rod portion 17 of the fishing rod 13 and the guides 21 to easily slide thereinto. The tube 27 has a first end 31 and a second end 33. The first end 31 of the tube 27 is opened to allow the distal end of the rod portion 17 of the fishing rod 13 to be inserted into the hollow interior 29 therethrough. The second end 33 of the tube 27 is preferably substantially closed. A transverse aperture 35 is preferably provided through the second end 33 of the tube 27.

The holder 11 includes a body 37 having a hollow interior 39 for receiving at least a portion of the fishing reel 15 and at least a portion of the handle portion 19 of the fishing rod 13. The body 37 has a first end 41 and a second end 43. The first end 41 of the body 37 is attached to the first end 31 of the tube 27 with the hollow interior 39 of the body 37 communicating with the hollow interior 29 of the tube 27 to allow the distal end of the rod portion 17 of the fishing rod 13 to be inserted into the hollow interior 29 of the tube 27 through the hollow interior 39 of the body 37 as will now be apparent to those skilled in the art. The hollow interior 39 is large enough to receive substantially all of the fishing reel 15 and a portion of the handle portion 19 of the fishing rod 13 with the fishing reel 17 mounted thereon. The second end 43 of the body 37 is preferably completely open to form a mouth 44 for allowing the fishing rod 13 and the fishing reel 15 to be inserted into the interior 39 therethrough while the first end 41 of the body 37 has an opening corresponding in size and shape to the open first end 31 of the tube 27 to allow the distal end of the rod portion 17 of the fishing rod 13 to be inserted into the interior 29 of the tube 27 therethrough. The body 37 preferably includes a first side 45 and a second side 47 located opposite and spaced from the first side 45 a distance at least slightly more that the width of the fishing reel 15. The body 37 preferably has a slot 49 for receiving the crank portion 25 of the fishing reel 15. The slot 49 is preferably provided in the first side 45 of the body 37 and extends from the second end 43 of the body 37 toward the first end 41 thereof. The end of the slot 49 adjacent the second end 47 of the body 37 is open to form a mouth 50 for allowing the crank portion 25 of the fishing reel 15 to easily slide thereinto when the fishing rod 13 and fishing reel 15 are inserted into the holder 11. A flange 51 is preferably provided about the slot 49 except at the mouth 50 to reinforce the slot 49 and protect any part of the crank portion 25 of the fishing reel 15 that extends outside the interior 39 of the body 37.

The holder 11 preferably includes securing means 53 for securing the fishing rod 13 and the fishing reel 15 to the holder 11. The securing means 53 preferably includes an elongated strap 55 having a first end 57 for being fixedly attached to the second side 47 of the body 37 and having a second end 59 for being removably attached to the first side 41 of the body 37. The securing means 53 preferably includes attachment means 61 for removably attaching the second end 59 of the strap 55 to the first side 45 of the body 37. The attachment means 61 preferably includes a first attachment member 63 attached to the second end 59 of the strap 55 and a second attachment member 65 attached to the first side 45 of the body 35. The first and second attachment members 63, 65 include coacting hook and pile type fastening members such as Velcro-type fastening members well known to those skilled in the art.

The holder 11 preferably includes padding means 67 secured within the hollow interior 39 of the body 37 for padding the fishing reel 15. The padding means 67 is preferably attached to the top of the body 37 within the interior 39 thereof and sized so as to allow the fishing rod 13 and fishing reel 15 to be easily inserted into the interior 39 of the body 37 while preventing the fishing reel 15 from being damaged within the interior 39 of the body 37 as will now be apparent to those skilled in the art. The padding means 67 preferably includes a foam rubber pad 69 glued or otherwise fixedly attached to the body 37 within the interior 39 thereof as will now be apparent to those skilled in the art.

The holder 11 preferably includes hanging means 69 for allowing the holder 11 to be hung from a support such as a nail. The hanging means 69 preferably includes a flexible loop 71 extending through the transverse aperture 35 through the second end 33 of the tube 27 to allow the holder 11 to be easily hung from a support such as a nail projecting from a wall or the like with or within the fishing rod 13 and fishing reel 15 secured within the holder 11 as will now be apparent to those skilled in the art.

The holder 11 may be constructed in various sizes and shapes depending on the specific size and type fishing rod 13 and fishing reel 15 it is meant to hold. Preferably, the tue 27 and body 37 are constructed out of a rigid material such as plastic. The tube 27 and body 37 are preferably constructed as a one-piece, integral unit. For example the tube 27 and body 37 may be blow molded out of plastic using a two piece mold. A flange 73 may be provided about the holder 11 except at the mouth 44 of the body 37 and the mouth 50 of the slot 49 where the two pieces of the mold fit together, etc., as will now be apparent to those skilled in the art. The flange 73 will strengthen and add stiffness to the holder 11 as will now be apparent to those skilled in the art.

The use and operation of the holder 11 is quite simple. To store a fishing rod 13 and fishing reel 15 in the holder 11, first the proper size and type holder 11 is selected, depending on the size and type of fishing rod 13 and fishing reel 15 to be stored. Next, with the strap 55 open as shown in broken lines in FIG. 4 and with the fishing reel 15 attached to the fishing rod 13, the distal end of the fishing rod 13 is merely slid into the hollow interior 29 of the tube 27 through the mouth 44 of the body 37 until the fishing reel 15 slides into the hollow interior 39 of the body 37 past the strap 55. Next, the strap 55 is brought around the rear of the fishing reel 15 and the second end 59 of the strap 55 attached to the body 37 via the attachment means 61 to thereby secure the fishing rod 13 and fishing reel 15 within the holder 11. It should be noted that the hollow interiors 29, 39 of the tube 27 and body 37 are preferably sized so the fishing rod 13 and fishing reel 15 can be inserted thereinto with a typical fishing lure (not shown) attached to thereby add to the convenience of the holder 11.

Although the present invention has been described and illustrated with respect to a preferred embodiment and a preferred use therefor, it is not to be so limited since modifications and changes can be made therein which are within the full intended scope of the invention.

I claim:

1. A holder for a fishing rod and fishing reel, said fishing rod including an elongated rod portion and a handle portion, said fishing reel being fixedly attached to said handle portion of said fishing rod and including a crank portion; said holder comprising:
   (a) an elongated tube having a hollow interior for receiving said rod portion of said fishing rod, said tube having a first end and a second end;
   (b) a body having a hollow interior for receiving said fishing reel and at least a portion of said handle portion of said fishing rod; said body having a first end and a second end; said first end of said body being attached to said first end of said tube with said hollow interior of said body communicating with said hollow interior of said tube; said body having a slot for receiving the crank portion of said fishing reel; said body including a first side and a second side located opposite and spaced from said first side;
   (c) securing means for securing said fishing rod and said fishing reel within said hollow interiors of said tube and said body; said securing means including an elongated strap having a first end for being fixedly attached to said second side of said body and having a second end for being removably attached to said first side of said body; and
   (d) padding means secured within said hollow interior of said body for padding said fishing reel.

2. The holder of claim 1 in which said securing means includes attachment means for removably attaching said second end of said strap of said securing means to said first side of said body.

3. The holder of claim 2 in which said attachment means of said securing means includes a first attachment member attached to said second end of said strap of said securing means and includes a second attachment member attached to said first side of said body.

4. The holder of claim 3 in which said first and second attachment members of said attachment means of said securing means includes coacting hook and pile type fastening members.

* * * * *